July 22, 1930.　　　　K. J. KUDER　　　　1,771,301

FORCE FEED LUBRICATION MECHANISM

Filed Jan. 30, 1928　　　3 Sheets-Sheet 1

Inventor
Karl J. Kuder
By Wood, Wood
Attorneys

July 22, 1930. K. J. KUDER 1,771,301
FORCE FEED LUBRICATION MECHANISM
Filed Jan. 30, 1928  3 Sheets-Sheet 3
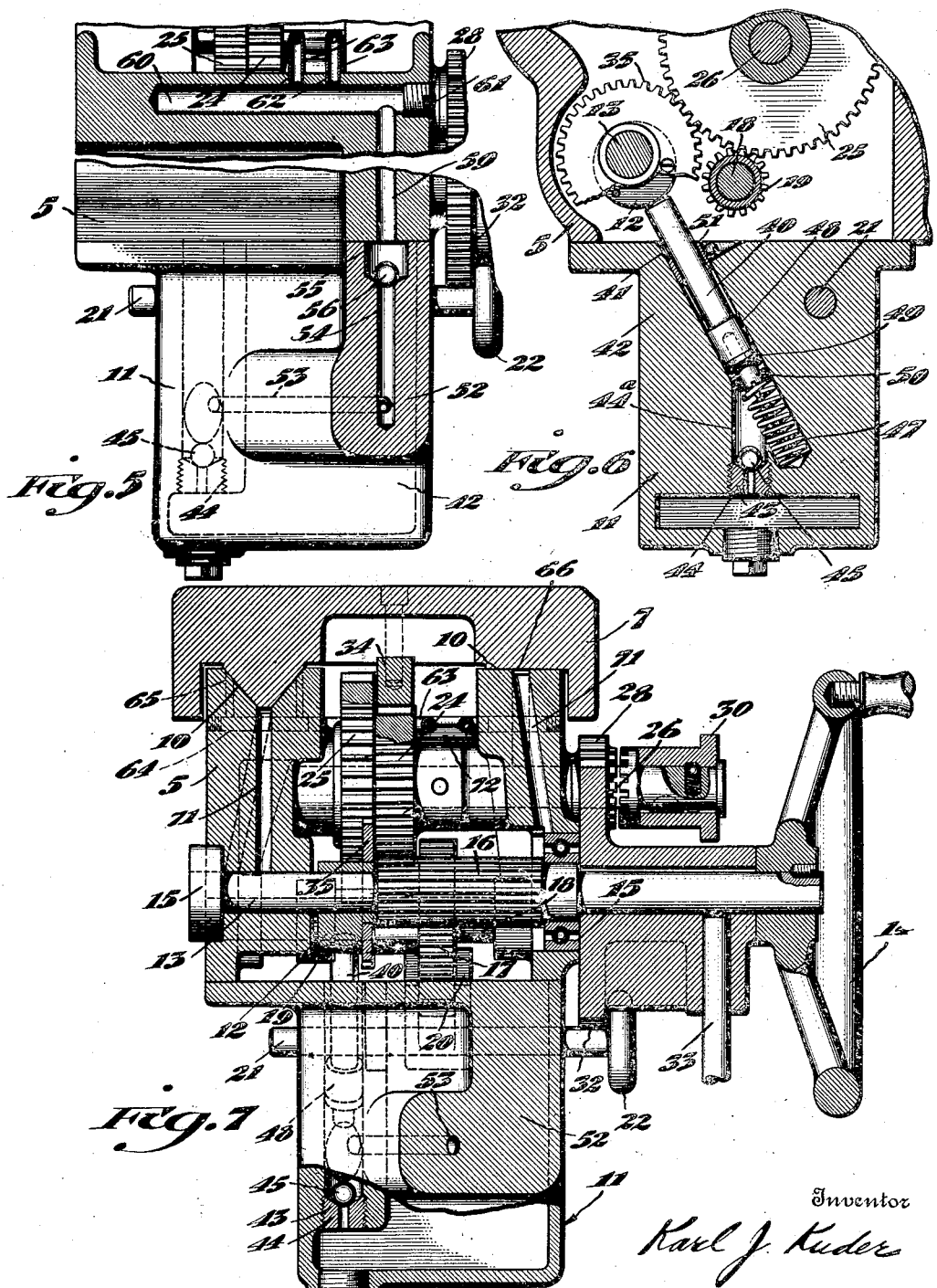
Inventor
Karl J. Kuder
By Wood & Wood
Attorneys Patented July 22, 1930

1,771,301

UNITED STATES PATENT OFFICE

KARL J. KUDER, OF CINCINNATI, OHIO, ASSIGNOR TO THE OESTERLEIN MACHINE COMPANY, OF CINCINNATI, OHIO, A CORPORATION OF OHIO

FORCE-FEED-LUBRICATION MECHANISM

Application filed January 30, 1928. Serial No. 250,639.

This invention relates to force feed lubrication and is particularly directed to the construction of the pumping unit therefor, and the formation and arrangement of the various elements of the mechanism being oiled for a proper distribution and return of the lubricant to a reservoir drawn from by the pump.

The pumping unit has been shown applied to a grinding machine, and the system incorporated in the machine for force feeding lubricant to a carriage or cross slide operating mechanism, and to the slideways in which the carriage is moved. The saddle supporting the carriage is formed to receive the lubricant after service on the slideways and to divert or convey the same back through the transmission chamber to the reservoir with portions of the oil returned via the various bearings of the carriage transmission. It is intended that the pump unit is adaptable for service in any mechanism where an automatic force feed lubrication is desired and that the system may be incorporated in any machine embodying a transmission and a carriage or slide operated thereby for feeding lubricant continuously during the movement of the slide.

It is, therefore, an object of this invention to provide a pumping mechanism for forcing lubricant to the slideways of a carriage saddle, the pump being actuated coincidentally with the motion of a carriage operated in the slideways for conveying lubricant under pressure from a supply reservoir to the slideways.

Another object is to provide an improved pump unit construction of the type force feeding measured quantities of lubricant in regular impulses to the various bearing surfaces of a mechanism.

Still another object is to provide an arrangement of the various elements of the mechanism for permitting a gravity return of the lubricant to the reservoir by way of inclined drainage surfaces and channels.

Further objects and advantages will be more fully set forth in the description of the accompanying drawings, forming a part of this specification, in which:

Figure 5 is an end view of the saddle and pump unit.

Figure 6 is a sectional view taken on line 6—6, Figure 2, detailing the mechanism for traversing the slide and for operating the lubricant pump.

Figure 7 is a sectional view taken on line 7—7, Figure 6, detailing the mechanism within the pump unit and showing the means for operating the same.

Figure 1:
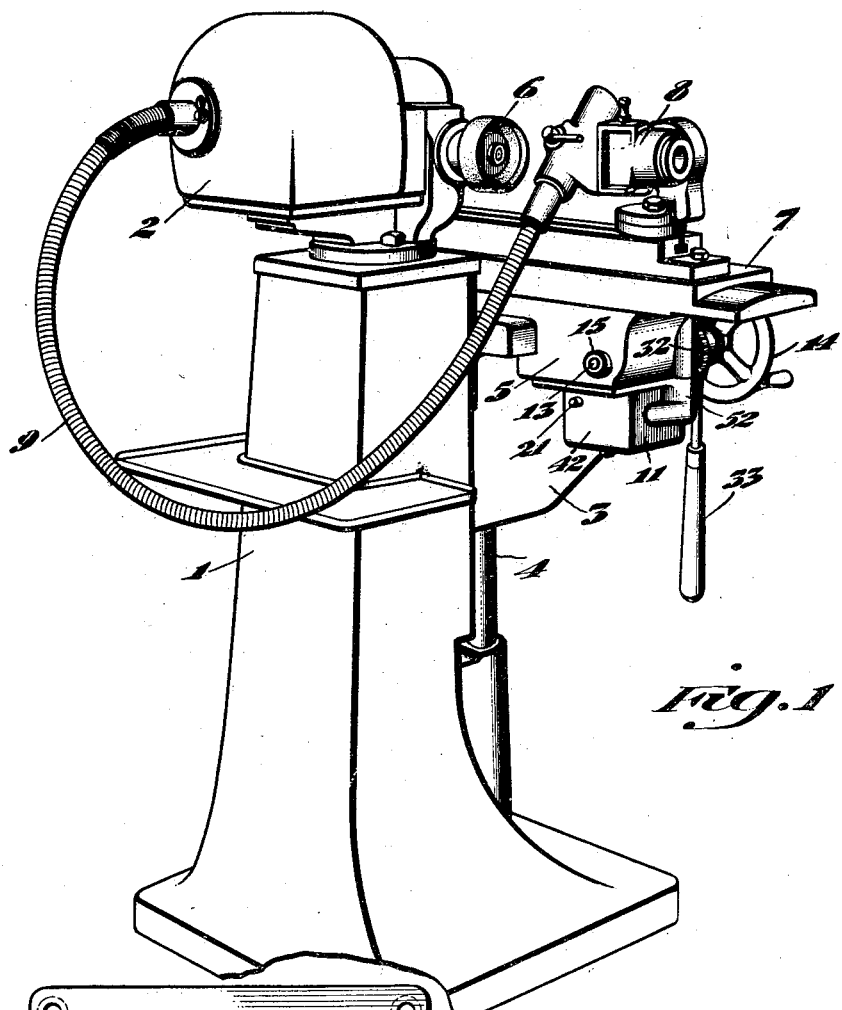
Figure 1 is a general view of a grinding machine having the improved lubricating system incorporated therein.

Referring to Figure 1 of the drawing, the pedestal or body of the machine is indicated at 1, and a motor 2, as the power source for the entire machine is mounted on top of the pedestal or body. A knee 3 is slidably mounted for vertical movement on the front of the pedestal and is elevated by means of a screw shaft 4. The screw shaft connection to the knee and the power connection to the screw are not shown herein since the involved mechanism forms no part of this invention. A carriage saddle 5 is slidably mounted on the knee for translation toward and from the pedestal for manipulating the work in relation to a grinder wheel 6, extending laterally from the motor casing and driven by the motor.

A carriage or cross slide 7 is mounted on the saddle 5, this cross slide supporting the work on spindles, the rotating spindle indicated at 8, while the stationary spindle is not shown, being hidden by the motor. The rotating spindle is driven by means of a flexible shaft 9, extending from the motor to the spindle. The carriage or cross slide 7 provides for longitudinal movement of the work parallel to the grinder wheel 6, and the saddle carrying the carriage provides the necessary movement of the work toward and from the grinder. As shown in the detailed views of the drawing the saddle is provided with a pair of slideways 10—10. These slideways are lubricated by means of a pump until 11 hung from the bottom of the saddle as shown in Figure 7, the pump being driven by a cam 12 loosely journalled on the hand wheel operated feed shaft 13. This feed shaft 13 is journalled in the side walls of the saddle, the saddle having a chamber formed at one end thereof for housing the various gears of the power transmission. The shaft 13 has a hand wheel 14, secured at its forward end and is journalled in bearings 15—15 in the front wall and the rear wall of the saddle respectively. A gear 16 is formed on the shaft and is disposed in the interior of the saddle. This gear 16 is in mesh with one gear 17, as one of a pair of integrally formed slidable gears 17, 19, mounted on a shaft 18, this shaft 18 being also journalled in the front and rear walls of the saddle. The gears 17 and 19 are shifted along the shaft 18 by means of a shifter arm 20, engaging the gear 17, the shifter arm being secured on a rod 21 slidably journalled in the pump casing and moved by means of a knob 22 located at the front of the mechanism. The gear 17 is constantly in mesh with a long gear 16 and may be shifted into engagement with a gear 24, whereas the smaller gear 19 may be shifted into engagement with a gear 25, the gears 24 and 25 being secured together and pinned to a cross shaft 26.

The cross shaft 26 extends forwardly through the front wall of the saddle and has loosely mounted thereon a gear 28 externally of the saddle. The gear 28 has clutch teeth formed integrally therewith at its forward side, the teeth adapted to mesh with the opposing teeth of a shift collar 30, the shift collar 30 being translatively and non-rotatively mounted on the shaft. The gear 28 is constantly in mesh with a large gear 32 journalled on the shaft 13. The gear 32 has a hub extending forwardly therefrom and is mounted between the hand wheel and the front wall of the saddle. A long lever 33 depends from the hub of the gear 32, this lever 33 being hand operated for oscillating the gear 32.

The gear 24 is in mesh with a rack 34 secured longitudinal of the carriage 7. Thus, when the clutch collar 30 is engaged with the clutch teeth of the gear 28 it is possible to rapidly traverse the carriage by moving the gear 32 through the lever 33 and transmitting motion through this carriage to the gear 38, gear 24 and the rack 34. On the other hand two slower speeds may be transmitted to the carriage through rotation of the hand wheel 14, the drive then being through the gear 16 through either gear 17 and 24 or gears 19 and 25.

The previously mentioned cam 12 is driven by means of a thin gear 35 secured thereto, this gear 35 being in mesh with the gear 25. By this mounting and driving connection it is provided that the pump cam is driven only when the carriage is being traversed, since the gear 25 rotates only at that time.

Figure 4:
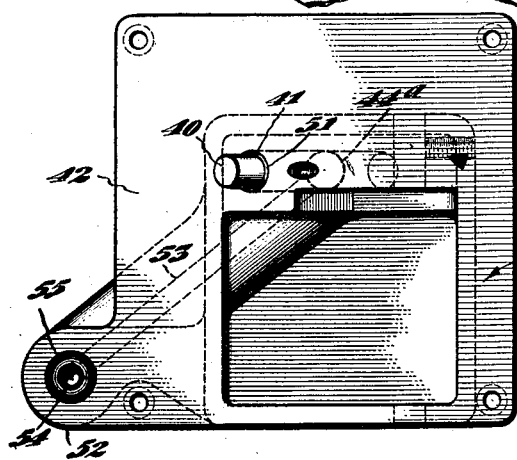
Figure 4 is a plan view of the pump unit showing it removed from the machine.
Figure 2:
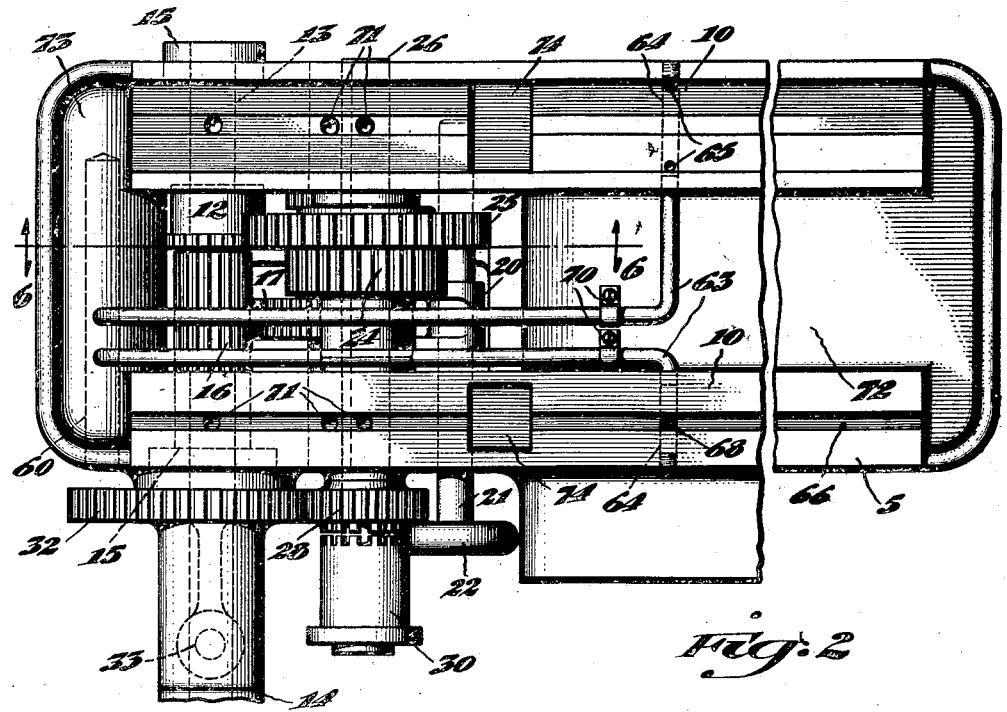
Figure 2 is a top plan view of the saddle showing the arrangement by which the lubricant is distributed to the slideways and also showing the mechanism mounted in the saddle for traversing the carriage or slide.
Figure 3:
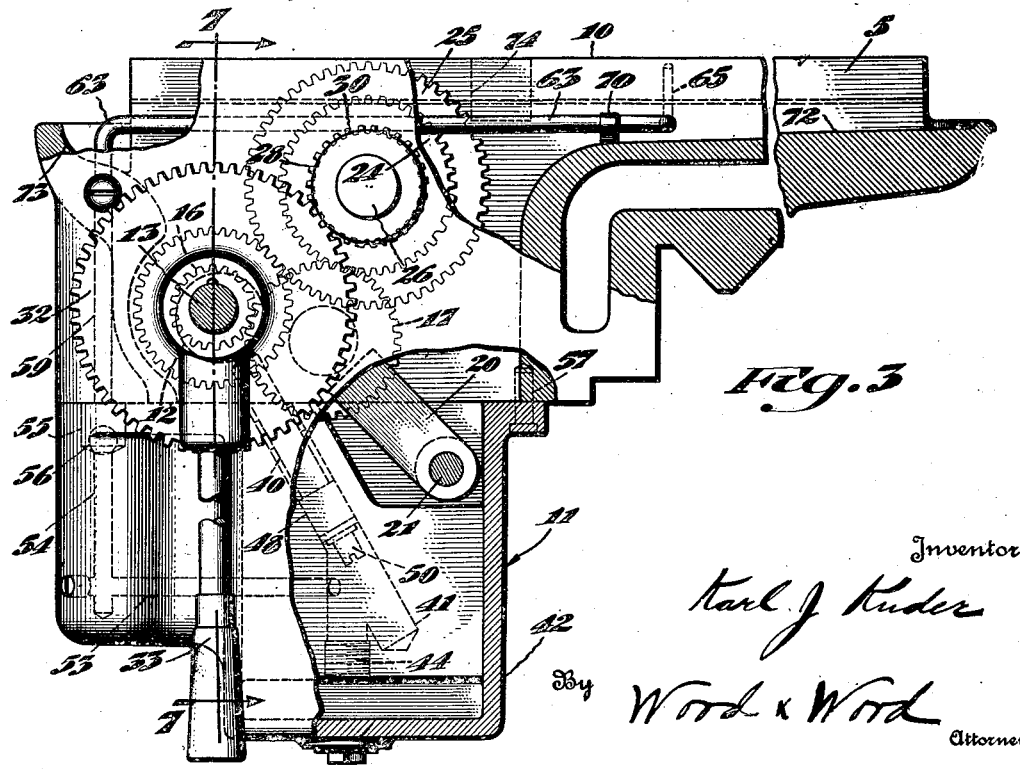
Figure 3 is a side elevation partly in section of the saddle taken from the front of the grinding machine further illustrating the mechanism shown in Figure 2.

As shown in Figure 7, the cam 12 operates a pump piston 40, this pump piston moving in an inclined bore 41 in the pump casing 42. As shown in Figure 4, the pump casing 42 is open at the top so that the oil chamber therein may be filled through the gear chamber of the saddle. The pump piston 41 is mounted at one side of the pump casing as shown in Figure 6 in a thickened wall portion, the remainder of the casing interior constituting the reservoir. A portion of the reservoir extends under the thickened wall portion and the oil is drawn upwardly from this extension through a valve 43. The valve 43 comprises a bushing 44 screwed in the lower end of a vertically disposed bore 44$^a$, the bushing having a small central bore and a ball 45 resting in the ball seat formed on the top of the bushing. This ball 45, due to gravity, normally obstructs the bushing bore. The vertically disposed bore intersects the inclined bore in which the piston 41 moves but at such point as to allow the lower end of said inclined bore to provide a seat for one end of a coil spring 47 disposed in the lower end of the inclined bore. This spring 47 is under compression and engages against the lower end of the piston. The piston 41 in detail comprises a shank portion engaging the cam, a head 48 at its lower end snugly fitting in the bore 41, and a leather ring 49 secured on its lower end by means of a long headed fillister screw 50, the screw 50 being screwed into the end of the piston and holding a washer against the leather washer. The upper end of the spring 47 encircles the head of the screw and is thereby centered against lateral movement. The shank portion of the piston is guided in the inclined bore by means of a collar 51 at the upper end of the bore, this collar being secured in place by means of a set screw screwed in from the upper face of the pump casing.

The outlet duct through which the pump piston ejects the oil extends from the vertical bore to the base of a circular boss 52 formed at one corner of the pump casing, and thence to the points to be lubricated. The action of the pump in forcing the oil from the reservoir through the outlet duct is as follows:

As the cam rotates and the piston is translated upwardly through the action of the coil spring the ball of the valve is lifted from its seat and a quantity of oil flows into the vertical bore and the lower end of the inclined bore. As the pump piston is forced downwardly by the rotation of the cam the ball is forced against its seat closing off the return of the oil to the reservoir, whereupon the oil is forced out through the outlet duct 53. The duct 53 is horizontally disposed and connects to the base of a vertically disposed duct 54, this duct 54 leading upwardly in the corner boss previously described to a valve chamber 55, a ball 56 seated within the valve chamber 55 preventing any back flow of the oil upon the sucking stroke of the piston.

The pump casing is secured to the underside of the saddle by means of screws 57. A vertically disposed duct 59, as a continuation of the duct 54, is formed in the saddle, this duct 59 intersecting a horizontally disposed bore 60, as a duct extending laterally from the vertically disposed duct 59. The bore 60 is formed from one side of the saddle and closed by means of a plug 61.

A pair of ducts 62 extend vertically and upwardly from the bore 60 to the upper surface of the saddle. Conduits 63, 63, have their ends secured into these last mentioned upwardly extending ducts and extend longitudinally of the saddle between the slideways. These pipe conduits may be bent in any manner to clear the mechanism and are connected at their opposite ends to bores 64, these bores 64 extending transversely to and under the respective slideways at intermediate points thereof.

The outer ends of the transversely extending bores are closed by means of plugs screw-threaded into the same. The slideways 10, 10 are of different formation, one being V-shaped and the other flat. In the case of the V-shaped slideway, a pair of vertically extending oil holes 65 extend from the oil channel 64 upwardly to the inclined bearing surfaces of the slideway. In the case of the flat slideway a groove 66 is formed centrally and longitudinally thereof and oil hole 68 extends upwardly from the transversely extending oil channels 64 entering into the groove 66. The conduits 63, 63 may be secured to the drainage surface of the saddle by means of clips 70.

The base of the V-shaped slideway and the longitudinal groove in the flat slideway provide oil channels along which the oil is distributed under the force feed. Inasmuch as these oil channels thus formed are disposed parallel to and above the side walls of the saddle it is provided that the lubricant may be conveyed to the various shaft bearings in the side walls. This is accomplished by providing vertically disposed oil holes 71 leading from the longitudinal oil channels to each bearing point.

The oil which is displaced from the slideway flows into the dished upper drainage surface 72 of the saddle and flows therefrom by gravity to the reservoir. The saddle has a rim extending around its ends to prevent any overflow of oil and the surface 72 thereof between the slideways is inclined downwardly from the end to the gear box portion of the saddle, and in the same way the surface 73 at the other side of the gear box is rounded off to readily permit the return of oil to the gear box. Recesses 74 are formed in the slideways intermediate thereof and serve as lubricant pools, the slide moving thereover and being constantly in engagement with the surface of the lubricant therein. By this disposition of the pumping unit and reservoir directly below the gear box it is provided that the pump may be driven from the gear train only as the slide is operated and that the oil pumped thereby may be forced to the slideways under pressure and from the slideways conveyed by gravity through the various oil channels and bearings and inclined surfaces back to the reservoir through the gear box.

Having described my invention, I claim:

1. In a lubrication system, a transmission casing, a lubricant reservoir casing secured beneath said transmission casing, a lubricant pump in said reservoir casing having a pumping plunger slidably mounted therein, said lubricant reservoir casing and pump unitarily detachable from the transmission casing, a cam mounted on a shaft of said transmission for reciprocating said plunger, and channels extending from said pump to the various bearings of the transmission for lubricating said transmission, the oil returning by gravity to the pump casing.

2. In a transmission lubrication system, a transmission, a transmission casing, a lubricant reservoir casing secured beneath said transmission casing, a lubricant pumping plunger slidably mounted in said casing, a carriage traversed by said transmission, a cam mounted on a shaft of said transmission for reciprocating said plunger, said cam driven by the gear of the transmission directly in engagement with the carriage, and channels extending from said pump to the various bearings of the transmission for lubricating said transmission during movement of the carriage.

3. In a traversing mechanism, a saddle, a carriage thereon, said saddle having slideways formed on its upper surface for receiving said carriage and a transmission chamber intermediate of and below said slideways, a pump unit secured beneath said transmission chamber, said pump driven from said transmission, said pump unit having a lubricant reservoir contained therein in communication with said transmission chamber, lubricant conduits extending from the pump to said slideways, and drainage surfaces between said slideways inclined from the outer ends thereof toward the transmission chamber whereby the lubricant displaced from the slideways is conveyed by gravity to the reservoir of the pump unit through the gears of the traversing mechanism.

4. A lubrication system of the class described, comprising, a saddle, a carriage slidably mounted thereon, a carriage traversing mechanism mounted in said saddle, a lubricant reservoir secured beneath said traversing mechanism, a pump operated by said mechanism for drawing lubricant from said reservoir, supply channels extending from said pump to the slideways of said saddle for conveying force fed lubricant to the slideways, and the saddle upper surface formed to permit gravity return of the lubricant to said reservoir.

5. In a slide traversing mechanism, a saddle, a carriage thereon, said saddle having slideways formed on its upper surface for slidably receiving said carriage and a transmission chamber intermediate of and below said slideways, a pump unit secured beneath said transmission chamber, said pump unit having a lubricant reservoir contained therein in communication with said transmission chamber, lubricant conduits extending from the pump to said slideways, and vertically disposed channels extending from the slideways to the various bearings of the traversing mechanism.

6. A lubrication system of the class described, comprising, a saddle having a transmission closure formed therein and parallel raised slideways formed longitudinally thereof, the remainder of the upper surface inclined toward the transmission casing and a rim formed around the ends of the saddle, a carriage mounted on said slideways, a carriage traversing mechanism in said closure, a lubricant reservoir secured beneath said traversing mechanism, a pump operated by said mechanism for withdrawing lubricant from said reservoir, and supply channels extending from said pump to the slideways of said saddle, the lubricant displaced from said slideways, returning by gravity to said reservoir.

In witness whereof, I hereunto subscribe my name.

KARL J. KUDER.